United States Patent Office 3,153,668
Patented Oct. 20, 1964

3,153,668
METHOD FOR PREPARING SALTS OF IMINODIACETIC ACID
Arthur R. Sexton, Midland, Mich., assignor to The Dow Chemical Company, Midland, Mich., a corporation of Delaware
No Drawing. Filed Nov. 2, 1959, Ser. No. 850,114
4 Claims. (Cl. 260—534)

This invention relates to a method for preparing iminodiacetic acid and the alkali and certain alkaline earth metal salts, of iminodiacetic acid, and separating the iminodiacetic acid from a mixture containing iminodiacetic acid and glycine.

It is known that primary and secondary amines may be completely carboxymethylated by reaction with aqueous sodium hydroxide and glycolonitrile, as taught in the patent to Kroll, U.S. 2,860,164, thus resulting in a completely or nearly completely carboxymethylated amine. The Kroll patent, however, offers no teaching concerning the preparation of a partly carboxymethylated amine except for disclosing that glycine, aqueous sodium hydroxide solution, and glycolonitrile were reacted to give a mixture of iminodiacetic acid and nitrilotriacetic acid. There is no mention, however, of the ratio of these two reaction products obtained.

However, it has been discovered that iminodiacetic acid is obtained in at least 60 percent yield by adding glycolonitrile to an excess of aqueous ammonia containing from one to two equivalents per mole of glycolonitrile of an alkali hydroxide or hydroxides of alkaline earth metals having an atomic number between 38 and 56, said alkaline earth metals being barium and strontium. The mole ratio of ammonia to glycolonitrile is maintained at from 12:1 to 30:1, preferably at from 14:1 to 20:1. When mole ratios of greater than 30:1 are used, a greater proportion of glycine to iminodiacetic acid is produced. The reaction mixture is heated to a temperature of between 50° C. and 150° C., preferably at from 95° C. to 110° C., and a pressure of from 0–200 pounds per square inch gauge, preferably from 90–110 p.s.i.g., for a period of time sufficient to effect substantially complete reaction; normally, from 3 to 4 hours are sufficient for complete reaction.

The excess ammonia may then be conveniently removed from the reaction mixture by reducing the pressure to atmospheric and heating the reaction mixture to approximately 108° C. and maintaining that temperature for 15–30 minutes.

Iminodiacetic acid and glycine can be separated by means of an ion exchange resin, using sufficient resin to retain all of the cations and all of the glycine, as explained under Example I. The salt solution is passed through a fixed bed of an acidified form of an ion exchange resin containing at least an amount of resin that is commensurate in ion exchanging capacity to the number of cation equivalent weights and the equivalent weights of glycine in the salt solution, thereby fixing the cations of the salt solution and the glycine in the bed of the resin. The tower is then eluted with an aqueous ammonia solution and three eluates are collected over three ranges of pH values, the first eluate consisting of iminodiacetic acid being collected at a pH of approximately 1.6 to 2.8. The second eluate, being collected at a pH of about 2.8 to 4.0, is a mixture of iminodiacetic acid and glycine and is conveniently purified by recycling through the resin. The third eluate is collected at a pH of about 4 to 9 and contains a mixture of glycine and ammonia.

The practice of the present invention is illustrated by the following examples.

*Example I*

An 8-liter stainless steel steam-heated autoclave equipped with a high speed agitator was cooled to 20° C. and charged with 2466 gms. (42 moles) of 30 percent aqueous ammonia, 150 gms. (3.75 moles) of sodium hydroxide dissolved in 600 gms. of water and 244.5 gms. (3.0 moles) of 70 percent glycolonitrile. The autoclave was closed to the atmosphere, steam applied to the jacket and the mixture heated 3½ hours at 100° C. and 100 p.s.i.g.

The contents of the autoclave were cooled, transferred to a 5-liter flask and the excess ammonia removed by heating to a pot temperature of 108° C.

The residue was diluted to 3 liters and passed at 75–90° C. through a tower containing 5.65 moles of Dowex 50 hydrogen form ion exchange resin (The Dow Chemical Company, Midland, Michigan), this being sufficient resin to retain all of the sodium ion, all of the glycine and a portion of the iminodiacetic acid. Dowex 50 is a strongly acidic cation exchange resin having sulfonic groups as the acid groups.

The tower was then eluted with 1 percent aqueous ammonia. The iminodiacetic was eluted first from the resin at an eluate pH of 1.6 to 2.8. The eluate coming through at a pH of 2.8 to 4.0 was a mixture of glycine and iminodiacetic acid and was further purified by recycling through the resin. The eluate coming through at a pH of 4 to 9 contained glycine and ammonia. The respective eluates from the tower, on evaporating and drying the residues to constant weight, showed a yield of 74 percent iminodiacetic acid and 26 percent glycine. No nitrilotriacetic acid could be detected.

*Example II*

In a manner similar to that in Example I, 13,200 grams (75 moles) of ammonia, 150 grams (3.75 moles) of sodium hydroxide, and 244.5 grams (3.0 moles) of 70 percent glycolonitrile were reacted at 100° C. and 110 p.s.i.g. for 4 hours. The excess ammonia was expelled and the reaction product passed through an ion exchange column as previously described. There was obtained a yield of 60 percent iminodiacetic acid and 39 percent glycine. No nitrilotriacetic acid could be detected.

In Example III which follows there is shown the mixture of acids obtained when a ratio of 9 moles of ammonia to 1 mole of glycolonitrile is employed with sodium hydroxide as the starting materials. A substantial amount of nitrilotriacetic acid is produced here, in contrast with the method of the present invention wherein no nitrilotriacetic could be detected in the reaction product.

*Example III*

In a manner similar to that in Example I, 1590 grams (27 moles) of 30 percent ammonia, 150 grams (3.75 moles) of sodium hydroxide, and 244.5 grams (3.0 moles) of 70 percent glycolonitrile were reacted at 100° C. and 90 p.s.i.g. for 3½ hours. The excess ammonia was expelled and the reaction product passed through an ion exchange column as previously described. There was obtained a 67 percent yield of iminodiacetic acid, a 16 percent yield of glycine and 17 percent yield of nitrilotriacetic acid.

I claim:
1. A method of preparation of salts of iminodiacetic acid, said salts being those of an alkaline compound selected from the group consisting of (1) alkali metals and (2) alkaline earth metals having an atomic number between 38 and 56, comprising, reacting, at a temperature of from 50°–150° C., one mole of glycolonitrile with from 12 to 30 moles of ammonia, and from 1 to 2 equivalents per mole of glycolonitrile of an alkaline compound selected from the group consisting of alkali hydroxides and hydroxides of alkaline earth metals whose atomic numbers are between 38 and 56, thus to produce an aqueous solution of the corresponding salt of iminodiacetic acid and glycine, said solution being substantially free of nitrilotriacetic acid salt.

2. A method as in claim 1 wherein the reaction temperature is from about 95° to 110° C.

3. A method as in claim 1 wherein the alkaline compound is sodium hydroxide.

4. A method as in claim 1 wherein the molar ratio of ammonia to glycolonitrile is from 14:1 to 20:1.

References Cited in the file of this patent

UNITED STATES PATENTS

| | | |
|---|---|---|
| 2,860,164 | Kroll et al. | Nov. 11, 1958 |
| 2,895,989 | Sexton | July 21, 1959 |

OTHER REFERENCES

Samuelson: "Ion Exhangers in Analytical Chemistry" (1953), pp. 210–220.

Block: Chemical Reviews (1946), vol. 38, pp. 523–524.